(12) United States Patent
Nagarajan et al.

(10) Patent No.: US 9,519,383 B2
(45) Date of Patent: Dec. 13, 2016

(54) ITO PATTERN FOR CAPACITIVE TOUCHSCREEN APPLICATIONS

(75) Inventors: Mythreyi Nagarajan, Singapore (SG); Kusuma Adi Ningrat, Singapore (SG)

(73) Assignee: STMICROELECTRONICS ASIA PACIFIC PTE LTD, Singapore (SG)

( * ) Notice: Subject to any disclaimer, the term of this patent is extended or adjusted under 35 U.S.C. 154(b) by 1165 days.

(21) Appl. No.: 13/567,855

(22) Filed: Aug. 6, 2012

(65) Prior Publication Data

US 2014/0035602 A1  Feb. 6, 2014

(51) Int. Cl.
*G01R 27/26* (2006.01)
*G06F 3/044* (2006.01)

(52) U.S. Cl.
CPC ..... *G06F 3/044* (2013.01); *G06F 2203/04103* (2013.01)

(58) Field of Classification Search
CPC ........ G06F 3/044; G06F 3/045; G06F 3/0488; G06F 3/04883; G06F 3/07886; G06F 3/0412; G06F 3/0414; G06F 3/0416; G01R 27/2605; G01D 5/24; G01D 5/2415; G01D 5/2412; G01D 5/2417; H01H 11/005; H01H 11/0056; H01L 2924/01079; H01L 2924/01078
USPC .... 324/658–661, 686, 688, 750.17; 345/173, 345/174
See application file for complete search history.

(56) References Cited

U.S. PATENT DOCUMENTS

| | | | |
|---|---|---|---|
| 2009/0002337 A1* | 1/2009 | Chang | G06F 3/044 345/174 |
| 2010/0007621 A1 | 1/2010 | Kang et al. | |
| 2010/0013745 A1* | 1/2010 | Kim | G06F 3/0412 345/76 |
| 2010/0156810 A1 | 6/2010 | Barbier et al. | |
| 2010/0302201 A1 | 12/2010 | Ritter et al. | |
| 2011/0025639 A1* | 2/2011 | Trend | G06F 3/044 345/174 |
| 2011/0050625 A1 | 3/2011 | Kim et al. | |
| 2012/0229414 A1* | 9/2012 | Ellis | G06F 3/044 345/174 |

(Continued)

OTHER PUBLICATIONS

Kolokowsky, Steve, et al: "Touchscreens 101: Understanding Touchscreen Technology and Design," CYPRESS Perform, Published in Planet Analog (http://www.planetanalog.com), Jun. 2009, 5 pages.

*Primary Examiner* — Son Le
*Assistant Examiner* — Thang Le
(74) *Attorney, Agent, or Firm* — Gardere Wynne Sewell, LLP

(57) ABSTRACT

A capacitive sensing structure is formed from first electrically conductive sensor structures electrically coupled to each other in a first direction, and second electrically conductive sensor structures electrically coupled to each other in a second direction. Each first electrically conductive sensor structure includes a first diamond-shaped central region with electrically coupled first finger structures extending away therefrom. Each second electrically conductive sensor structure includes a second diamond-shaped central region with electrically conducting second finger structures extending away therefrom. Each second finger structure extends between two adjacent ones of the first finger structures. Floating structures may be included within an opening formed in the first diamond shaped central region. Floating structures may further be included between the first and second finger structures.

30 Claims, 7 Drawing Sheets

(56) References Cited

U.S. PATENT DOCUMENTS

| | | | |
|---|---|---|---|
| 2013/0120303 A1* | 5/2013 | Hong | G06F 3/0412 345/173 |
| 2013/0154996 A1* | 6/2013 | Trend | H03K 17/9622 345/174 |
| 2013/0155000 A1* | 6/2013 | Trend | G06F 3/044 345/174 |

* cited by examiner

ITO PATTERN FOR CAPACITIVE TOUCHSCREEN APPLICATIONS

TECHNICAL FIELD

The present invention relates to capacitive sensing input devices, and in particular to a single layer indium tin oxide (ITO) pattern for use in a capacitive touchscreen sensor.

BACKGROUND

Reference is now made to FIG. 1 which illustrates a prior art two-layer indium tin oxide (ITO) pattern for a capacitive touchscreen sensor. A diamond-shaped electrode pattern is commonly used. A first set of diamond-shaped sensors 12, often referred to in the art as the "Yforce" structure, are provided in a first material layer. The sensors 12 are arranged in a matrix. The sensors 12 in each column are connected to each other by a connecting member 14. The sensors 12 in adjacent columns are isolated from each other. The sensors 12 and connecting members 14 are made of a first patterned ITO layer. A second set of diamond-shaped sensors 22, often referred to in the art as the "Xsense" structure, are provided in a second material layer isolated from the first material layer. The sensors 22 are arranged in a matrix. The sensors 22 in each row are connected to each other by a connecting member 24. The sensors 22 in adjacent rows are isolated from each other. The sensors 22 and connecting members 24 are made of a second patterned ITO layer.

The matrix of the sensors 12 is interleaved with the matrix of sensors 22 in a manner where the space between a group of four diamond-shaped sensors 12 is occupied by one of the diamond-shaped sensors 22, and the space between a group of four diamond-shaped sensors 22 is occupied by one of the diamond-shaped sensors 12.

The first patterned ITO material layer including sensors 12 and connecting members 14 may be the lower layer of the capacitive sensor and the second patterned ITO material layer including sensors 22 and connecting members 24 may be the upper layer (as shown in FIG. 1), or vice versa. The first and second patterned ITO material layers are isolated from each other by an interposed insulating layer. The insulating layer, first patterned ITO material layer and second patterned ITO material layer are supported by a transparent substrate layer.

Reference is now made to FIG. 2 which illustrates a prior art single layer indium tin oxide (ITO) pattern for a capacitive touchscreen sensor. Again, a diamond-shaped electrode pattern is commonly used. A first set of diamond-shaped sensors 32, often referred to in the art as the "Yforce" structure, are provided in a first material layer. The sensors 32 are arranged in a matrix. A second set of diamond-shaped sensors 42, often referred to in the art as the "Xsense" structure, are also provided in the same first material layer. The sensors 42 are arranged in a matrix. The sensors 42 in each row are connected to each other by a connecting member 44. The sensors 42 in adjacent rows are isolated from each other. The sensors 32, sensors 42 and connecting members 44 are made of a first patterned ITO layer. The sensors 32 in each column are connected to each other by conductive bridges 34 provided in a second material layer isolated from the first material layer. The conductive bridges 44 may be made of a second patterned ITO layer, or made from any other patterned conductive material layer. The sensors 32 in adjacent columns are isolated from each other.

The matrix of the sensors 32 is interleaved with the matrix of sensors 42 in a manner where the space between a group of four diamond-shaped sensors 32 is occupied by one of the diamond-shaped sensors 42, and the space between a group of four diamond-shaped sensors 42 is occupied by one of the diamond-shaped sensors 32.

The first patterned ITO material layer including sensors 32, sensors 42 and connecting members 44 may be the lower layer of the capacitive sensor and the second patterned ITO material layer including conductive bridges 34 may be the upper layer (as shown in FIG. 2), or vice versa. The first and second patterned ITO material layers are isolated from each other by an interposed insulating layer. The insulating layer, first patterned ITO material layer and second patterned ITO material layer are supported by a transparent substrate layer.

The prior art indium tin oxide patterns described above typically overlay a display screen in a stacked configuration. Commonly, that display screen is a liquid crystal display (LCD) although other display technologies may also be used. In operation, these prior art indium tin oxide patterns can suffer from an unacceptable amount of noise captured from the underlying LCD display screen. Additionally, there is room for improvement with respect to sensitivity of the prior art indium tin oxide patterns to capacitive touches (or proximity detections).

A need accordingly exists in the art for an improved ITO pattern for capacitive touchscreen applications.

SUMMARY

In an embodiment, a capacitive sensing structure comprises: a plurality of first electrically conductive sensor structures electrically coupled to each other in a first direction, and a plurality of second electrically conductive sensor structures electrically coupled to each other in a second direction intersecting (preferably, but not limited to, orthogonal to) the first direction. Each of the first electrically conductive sensor structures comprises: a central diamond-shaped region having a peripheral edge; and a plurality of first finger structures electrically coupled to the central diamond-shaped region and extending away from the peripheral edge towards the second direction.

In an embodiment, a capacitive sensing structure comprises: a plurality of first electrically conductive sensor structures electrically coupled to each other in a first direction, and a plurality of second electrically conductive sensor structures electrically coupled to each other in a second direction intersecting (preferably, but not limited to, orthogonal to) the first direction. Each of the first electrically conductive sensor structures comprises: a first central region; and a plurality of first finger structures electrically coupled to the first central region and extending away from the first central region. Each of the second electrically conductive sensor structures comprises: a second central region; and a plurality of second finger structures electrically coupled to the second central region and extending away from the second central region. Each second finger structure extends between adjacent first finger structures.

In an embodiment, a capacitive sensing structure, comprises a plurality of electrically conductive sensor structures electrically coupled to each other in a first direction. Each electrically conductive sensor structure comprises: a diamond-shaped central region; and a plurality of finger structures electrically coupled to the diamond-shaped central region and extending away from the diamond-shaped central region either in the same direction as the first direction or towards a second direction intersecting (preferably, but not limited to, orthogonal to) the first direction.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
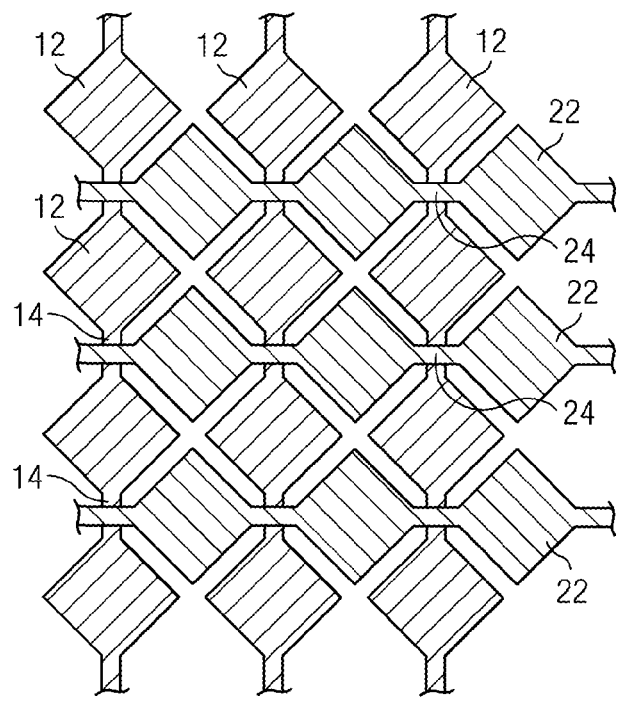
FIG. 1 illustrates a prior art two-layer indium tin oxide (ITO) pattern for a capacitive touchscreen sensor.
Figure 2:
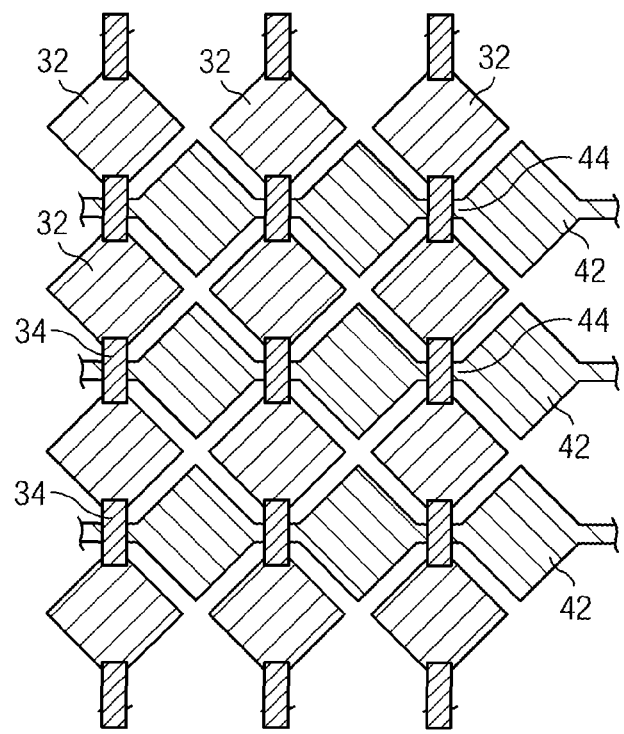
FIG. 2 illustrates a prior art single layer ITO pattern for a capacitive touchscreen sensor.
Figure 3:
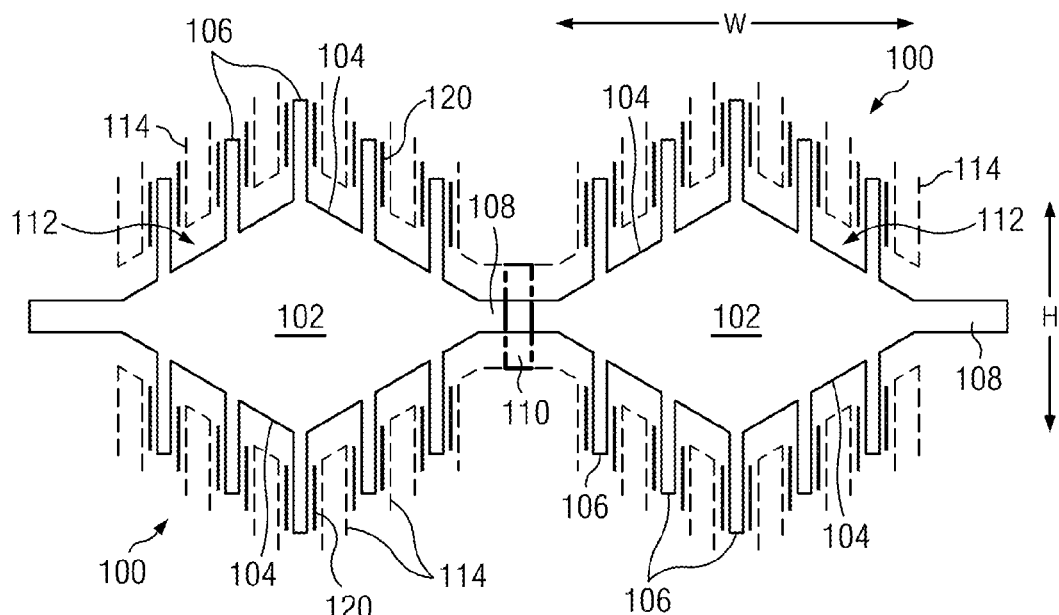
FIG. 3 illustrates an embodiment for a diamond-shaped ITO pattern for a capacitive touchscreen sensor.

Reference is now made to FIG. 3 which illustrates an embodiment for a diamond-shaped ITO pattern 100 for use in a capacitive touchscreen sensor. The diamond-shaped ITO pattern 100 is illustrated for use in connection with the "Xsense" structure and comprises central diamond-shaped region 102 with a reduced area (in comparison to the area of the conventional prior art diamond shaped regions as shown in FIGS. 1 and 2). The area of the central diamond-shaped region 102 is reduced by flattening the central diamond-shaped region 102 such that its vertical bisecting height ("h") is a fraction of the horizontal bisecting width ("w"). The ratio of height to width (h:w) of the flattened central diamond-shaped region 102 may range from 1:3 to 3:4, with 1:2 being preferred.

The central diamond-shaped region 102 has a perimeter defined by four edges 104. Extending from each of the four edges 104 are a plurality of projecting fingers 106. In a preferred embodiment, the projecting fingers 106 extend from the edges 104 in a vertical direction (i.e., perpendicular to the horizontal width bisector, and parallel to the vertical height bisector) and terminate at a distal end. It will be understood that any suitable orientation angle for the projecting fingers 106 may be selected. For example, the projecting fingers 106 may alternatively extend in a direction that is generally towards the vertical direction, and in a specific implementation of this in a direction which is perpendicular to the edges 104.

Adjacent diamond-shaped ITO patterns 100 are connected by a connecting member 108.

The central diamond-shaped region 102, the plurality of projecting fingers 106 and the connecting member 108 may be fabricated of a single patterned ITO layer for the capacitive touchscreen sensor. In a two-layer ITO capacitive touchscreen sensor pattern, the "Yforce" sensors for the vertical columns (see, for example, sensors 12 of FIG. 1) would be formed in a separate patterned ITO layer insulated from the patterned ITO layer providing the central diamond-shaped region 102, the plurality of projecting fingers 106 and the connecting member 108. In a single layer ITO capacitive touchscreen sensor pattern, the "Yforce" sensors for the vertical columns (see, for example, sensors 32 of FIG. 2) would be formed in the same patterned ITO layer providing the central diamond-shaped region 102, the plurality of projecting fingers 106 and the connecting member 108. A connecting bridge 110 formed on a separate second patterned ITO layer or made from any other patterned conductive material layer would then be provided for making the vertical electrical connections. Structures 108 and 110 would be electrically isolated from each other by an interposed insulating layer.

The central diamond-shaped region 102, projecting fingers 106 and connecting member 108 are electrically connected to each other.

The diamond-shaped ITO pattern 100 is preferably used in connection with the horizontal sensing structure of the capacitive touchscreen sensor as the "Xsense" structure. Thus, the diamond-shaped ITO pattern 100 would replace, for example, the second set of diamond sensors 22 in a sensor as shown in FIG. 1, or replace the second set of diamond sensors 42 in a sensor as shown in FIG. 2.

Although the preferred implementation is for use of the diamond-shaped ITO pattern 100 in the horizontal sensor, it will be understood that the diamond-shaped ITO pattern 100 could alternatively be used in the vertical sensor as the "Yforce" structure.

The regions 112 between projecting fingers 106 are preferably occupied by projecting fingers 114 (illustrated with dashed lines) of "Yforce" sensors for the vertical columns which extend from a central region (see, FIG. 4A for example) and terminate at a distal end near the edge 104. Thus, it will be understood that the projecting fingers 106 and projecting fingers 114 are interdigitated. In a preferred single layer ITO implementation, the projecting fingers 114 for the vertical column "Yforce" sensors are formed by the same single patterned ITO layer used for the central diamond-shaped region 102, the plurality of projecting fingers 106 and the connecting member 108.

The regions between projecting fingers 106 and the projecting fingers 114 may be occupied by floating separators 120. The floating separators 120 are conductive linear segments which are not electrically connected to either the "Yforce" vertical sensor or the "Xsense" horizontal sensor In other words, the floating separators 120 have no electrical connection to either the projecting fingers 106 or 108 or 102 or the projecting fingers 114. In a preferred single layer ITO implementation, the floating separators 120 are formed by the same single patterned ITO layer used for the central diamond-shaped region 102, the plurality of projecting fingers 106, the connecting member 108 and the projecting fingers 114 and vertical column sensors.

FIG. 3 illustrates placement of floating separators 120 between the projecting fingers 106 and the projecting fingers 114. It will be understood that the floating separators 120 could additionally, or alternatively, be placed between the ends of the projecting fingers 114 and the side edges of the central diamond-shaped region 102. It will also be understood that the floating separators 120 could additionally be placed between the ends of the projecting fingers 106 and the structure of the vertical column sensors. Thus, it will be understood that the floating separators 120 comprise interposed structures.

Figure 4A:
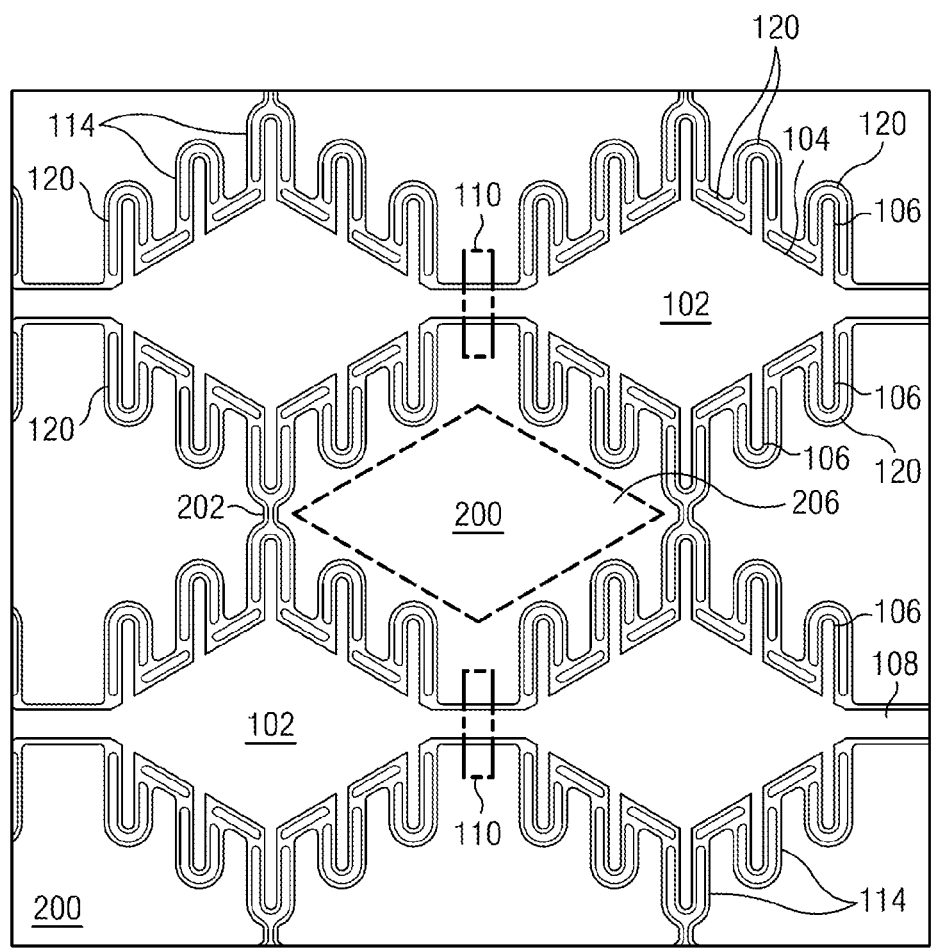
FIG. 4A illustrates another embodiment for a diamond-shaped ITO pattern for a capacitive touchscreen sensor.

Reference is now made to FIG. 4A which illustrates an alternative embodiment for a diamond-shaped ITO pattern 100 for exemplary use as an "Xsense" structure in a capacitive touchscreen sensor. Like reference numbers refer to like or similar parts. FIG. 4A illustrates placement of floating separators 120 having a linear segment shape between the distal ends of the projecting fingers 114 and the side edges of the central diamond-shaped region 102. FIG. 4A further illustrates placement of floating separators 120 having a curved segment (for example, horseshoe) shape between the distal ends of the projecting fingers 106 and the structure 200 of the "Yforce" vertical column sensors. The structures 200 for the vertical column sensors are connected in a column by the connecting bridge 110 (preferably provided on a separate patterned ITO/conductive material layer), with the columns of structures 200 separated from each other at the region 202.

All of the structures illustrated in FIG. 4A, with the exception of the connecting bridge 110, are preferably formed from a single patterned ITO layer.

The structure 200 of each "Yforce" vertical column sensor may accordingly be considered to be formed by a central region with projecting fingers 114 extending away from that central region. The central region for the structure 200 may be considered to comprise a diamond-shaped structure as shown by reference 206. The projecting fingers 114 accordingly extend away from a peripheral edge of the central region 206.

Figure 4B:
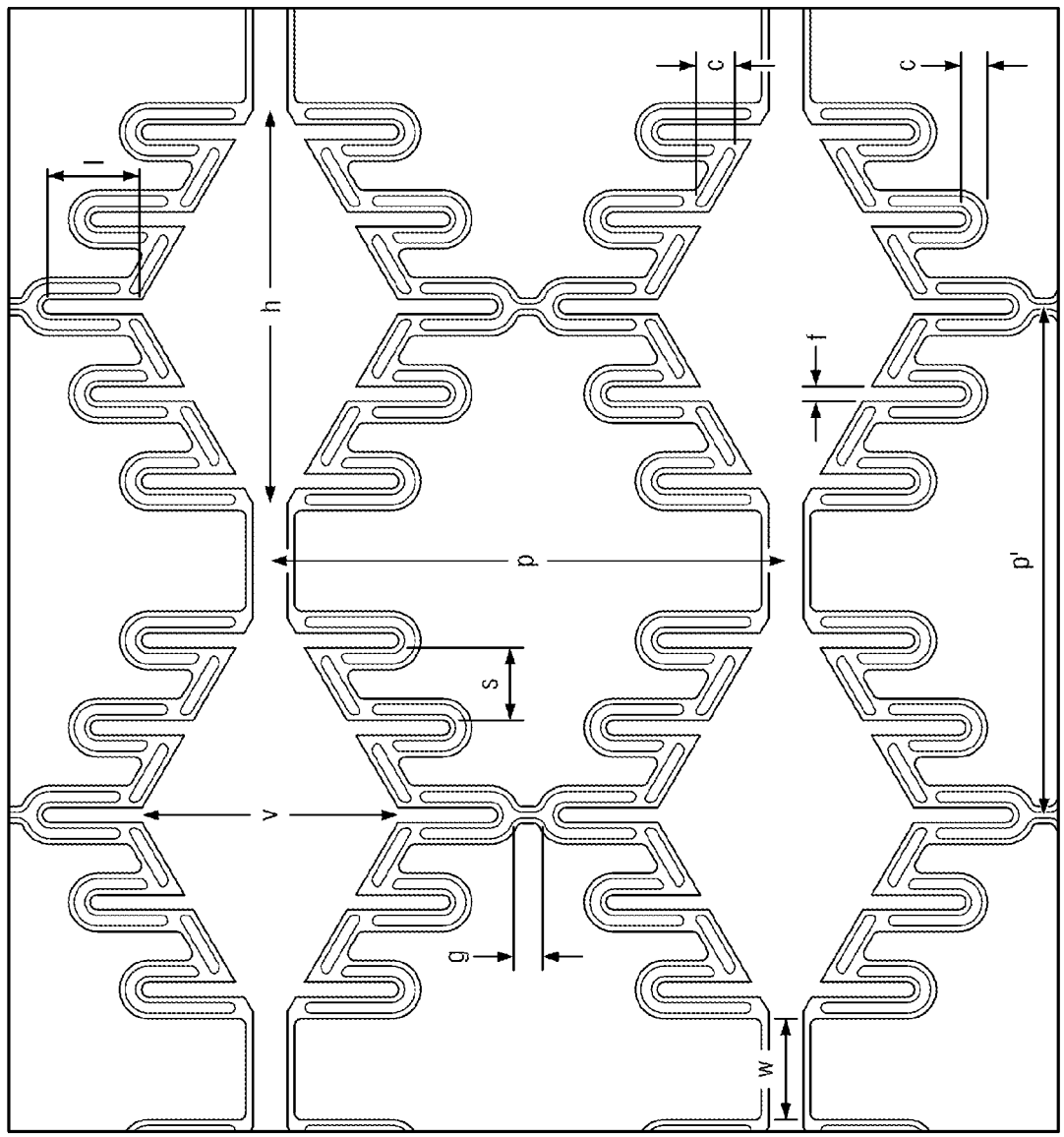
FIG. 4B illustrates dimensional relationships with respect to FIG. 4A.

FIG. 4B illustrates dimensional relationships for the diamond-shaped ITO pattern 100 structure of FIG. 4A. The following Table provides information concerning selection of the dimensional values for an exemplary implementation of the sensor.

| Symbol | Description | Dimensions (suggested exemplary figures) |
|---|---|---|
| v | Vertical diagonal of XSense | 50% of h |
| h | Horizontal diagonal of Xsense | p' − w |
| p | Distance between adjacent Xsense channels | Calculated based on the aspect ratio and number of channels |
| p' | Distance between adjacent Yforce channels | |
| g | Gap between adjacent Xsense channels | 0.1 mm |
| f | Width of the finger projecting into Yforce | 0.1 mm−0.2 mm (depending on ITO resistivity |
| c | Floating Separation between the YForce and XSense | 40% to 50% of the Cover Lens thickness |
| s | Distance between projecting fingers in the same XSense | 2*f or 3*f |
| l | Length of the XSense finger projecting into the YForce | (p − v − 2*g)/2 |
| w | Length of the bridge connecting two structures | 0.2 mm (depending on the ITO resistivity) |

Figure 5:
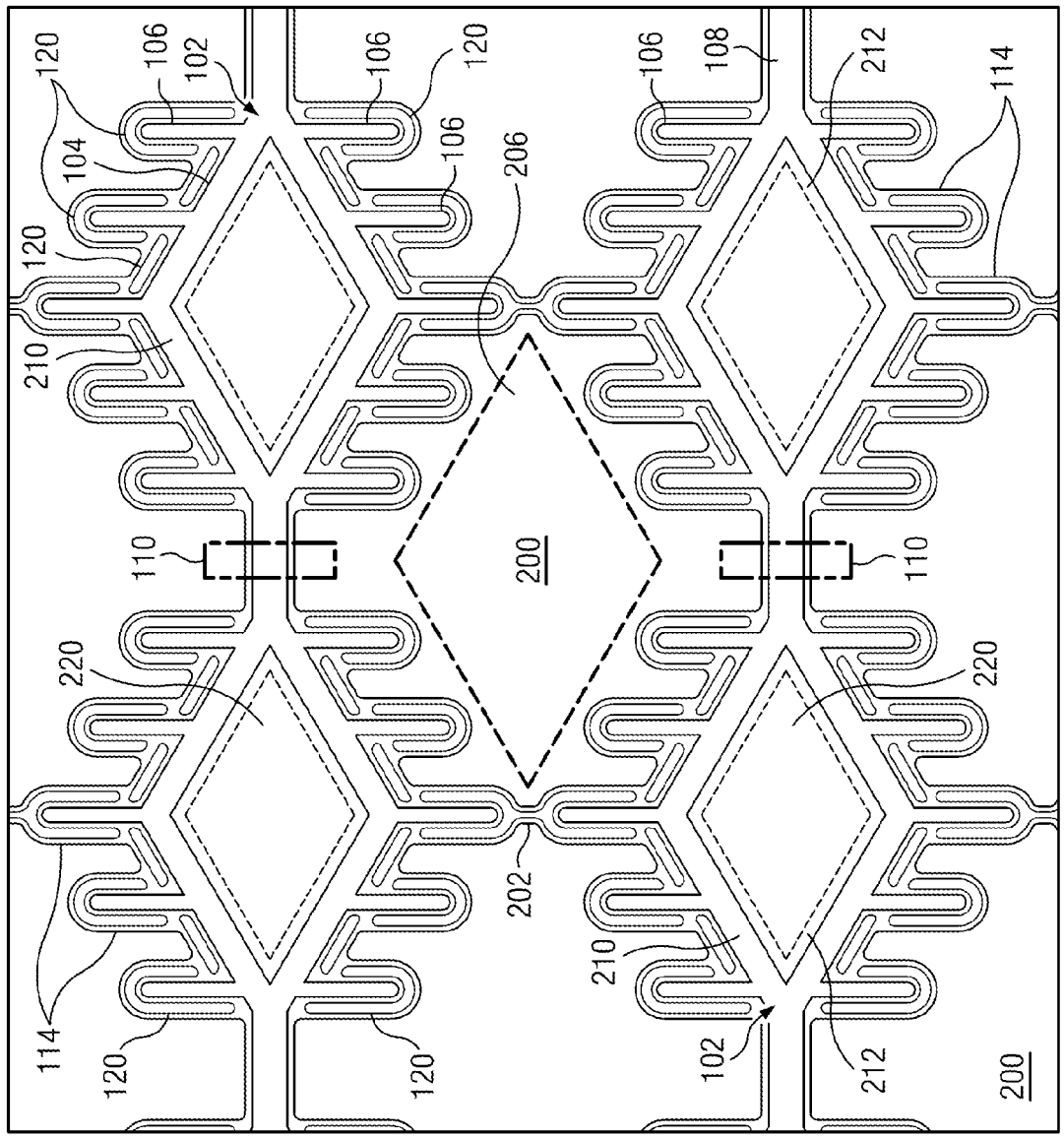
FIG. 5 illustrates another embodiment for a diamond-shaped ITO pattern for a capacitive touchscreen sensor.

Reference is now made to FIG. 5 which illustrates an alternative embodiment for a diamond-shaped ITO pattern 100 for exemplary use as an "Xsense" structure in a capacitive touchscreen sensor. Like reference numbers refer to like or similar parts. FIG. 5 illustrates a different structure for the central diamond-shaped region 102. In this implementation, the central diamond-shaped region 102 is hollow formed by a diamond-shaped ring 210 encircling a diamond-shaped opening 212. The diamond-shaped opening 212 may be empty. However, in a preferred embodiment, a floating separator 220 is provided in each opening 210. The floating separators 220 are conductive segments which are not electrically connected to each other or to any other structure of the sensor. In a preferred single layer ITO implementation, the floating separators 220 are formed by the same single patterned ITO layer used for the diamond-shaped ring 210 (of the central diamond-shaped region 102), the plurality of projecting fingers 106, the connecting member 108, the structures 200 of the column sensors (including projecting fingers 114) and floating separators 120.

Figure 6:
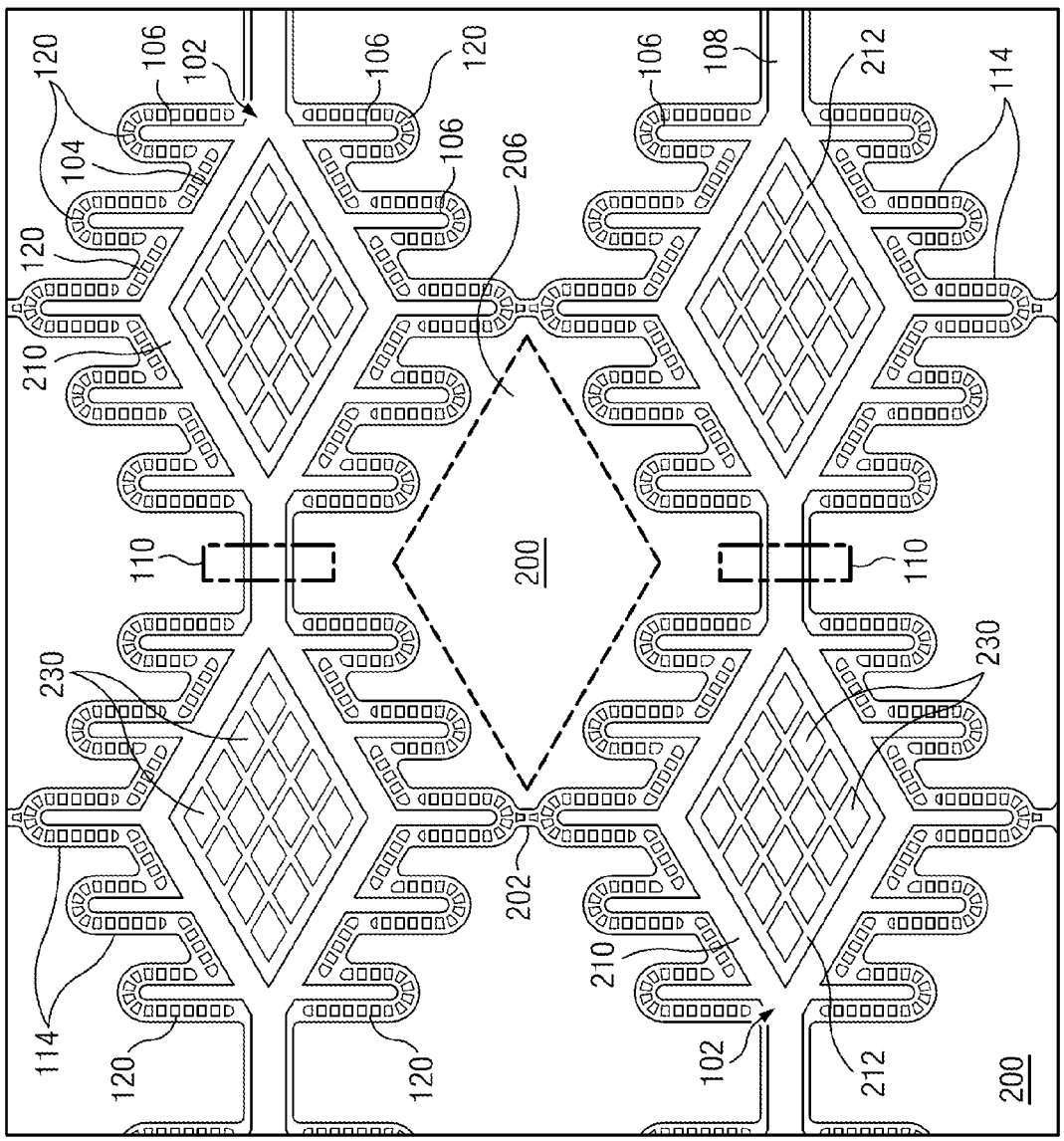
FIG. 6 illustrates another embodiment for a diamond-shaped ITO pattern for a capacitive touchscreen sensor.

Reference is now made to FIG. 6 which illustrates an alternative embodiment for a diamond-shaped ITO pattern 100 for exemplary use as an "Xsense" structure in a capacitive touchscreen sensor. Like reference numbers refer to like or similar parts. FIG. 6 illustrates a different structure for the floating separators 120 which are made from a plurality of individual tile segments arranged together (the number of tile segments being exemplary only). FIG. 6 further illustrates a different structure for the floating separators 220 provided within the diamond-shaped opening 212 of the central diamond-shaped region 102. In this implementation, rather than provide a single floating separator 220 structure within each opening 212 (as shown in FIG. 5), a plurality of floating separators 230 are providing within each opening 212. FIG. 6 illustrates a tiled arrangement for the plurality of floating separators 230. It will be understood, however, that this arrangement is merely exemplary of one way to arrange the plurality of floating separators 230 within each opening 212. Furthermore, the use of diamond-shaped tiles for the plurality of floating separators 230 is exemplary only, it being understood that other tile shapes, for example, round, triangular, hexagonal, rectangular, and the like, could instead be chosen. The floating separators 230 are conductive segments which are not electrically connected to each other or to any other structure of the sensor. In a preferred single layer ITO implementation, the floating separators 230 are formed by the same single patterned ITO layer used for the diamond-shaped ring 210 (of the central diamond-shaped region 102), the plurality of projecting fingers 106, the connecting member 108, the structures 200 of the column sensors (including projecting fingers 114) and floating separators 120.

Figure 7:
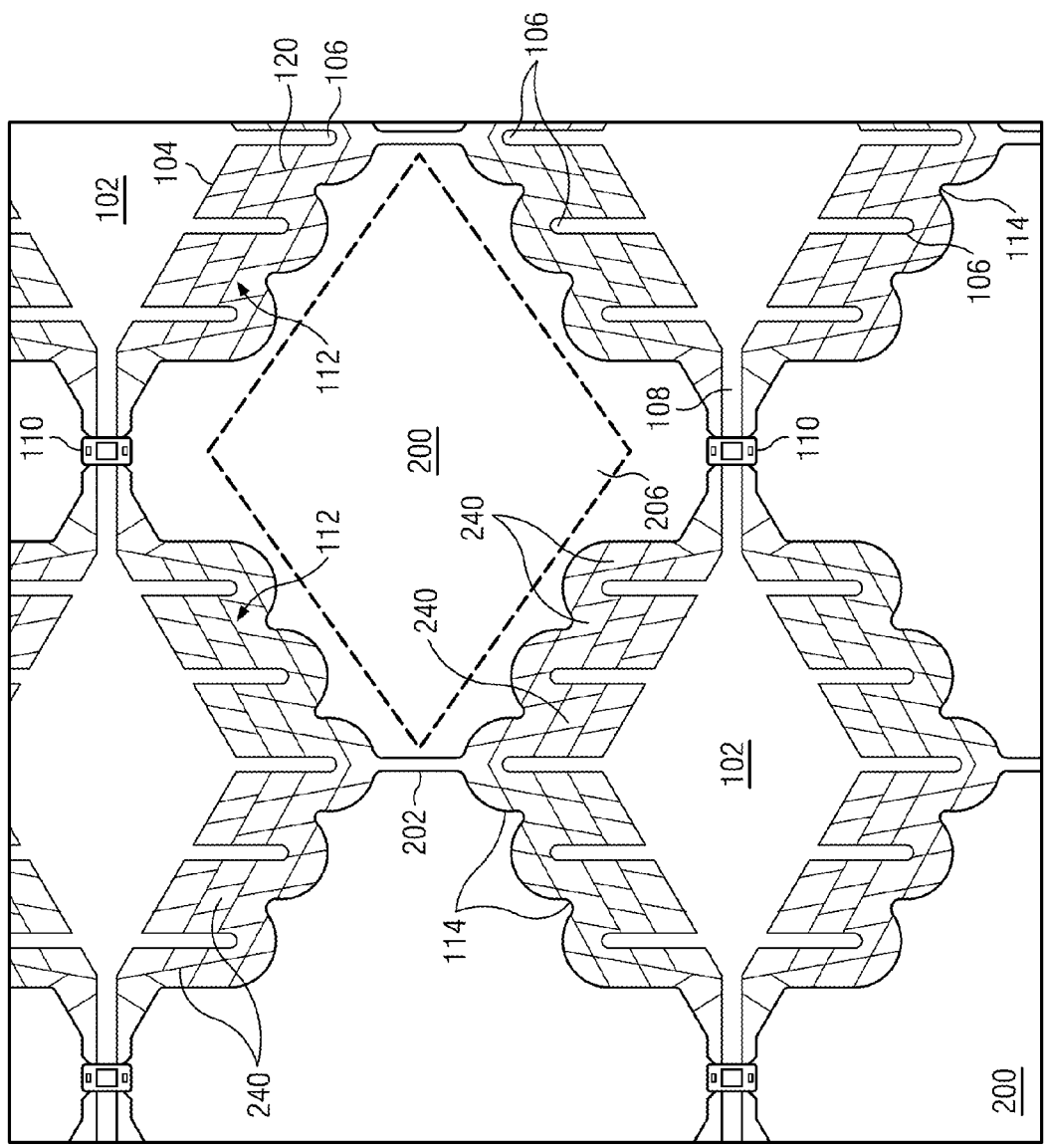
FIG. 7 illustrates another embodiment for a diamond-shaped ITO pattern for a capacitive touchscreen sensor.

Reference is now made to FIG. 7 which illustrates an alternative embodiment for a diamond-shaped ITO pattern 100 for exemplary use as an "Xsense" structure in a capacitive touchscreen sensor. Like reference numbers refer to like or similar parts. FIG. 7 illustrates a different structure for the floating separators 120. In this implementation, rather than provide floating separators 120 in the form of linear segments (as shown in FIG. 4A), the regions 112 between projecting fingers 106 are filled with a plurality of floating separators 240. FIG. 7 illustrates a tiled arrangement for the plurality of floating separators 240. It will be understood, however, that this arrangement is merely exemplary of one way to arrange the plurality of floating separators 240 within the regions 112. Furthermore, the use of diamond-shaped tiles for the plurality of floating separators 240 is exemplary only, it being understood that other tile shapes, for example, round, triangular, hexagonal, rectangular, and the like, could instead be chosen. The floating separators 240 are conductive segments which are not electrically connected to each other or to any other structure of the sensor. In a preferred single layer ITO implementation, the floating separators 240 are formed by the same single patterned ITO layer used for the central diamond-shaped region 102, the plurality of projecting fingers 106, the connecting member 108, and the structures 200 of the column sensors (including projecting fingers 114). It will further be noted that the floating separators 240 substantially fill the regions 112 between projecting fingers 106. In this implementation, the projecting fingers 114 (for the Yforce structure) are either shortened in length (as shown) or eliminated.

Figure 8:
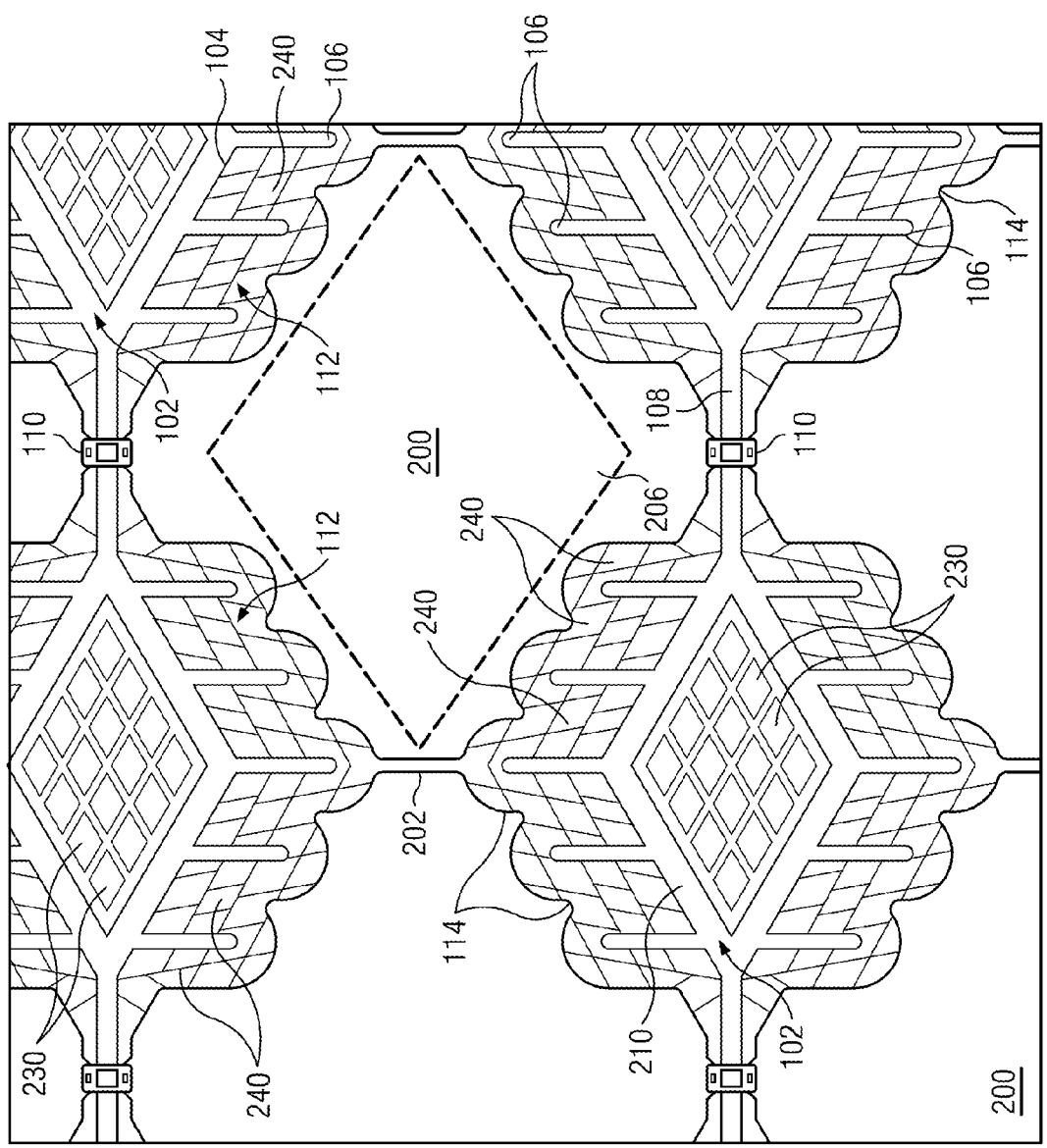
FIG. 8 illustrates another embodiment for a diamond-shaped ITO pattern for a capacitive touchscreen sensor.

Reference is now made to FIG. 8 which illustrates an alternative embodiment for a diamond-shaped ITO pattern 100 for exemplary use as an "Xsense" structure in a capacitive touchscreen sensor. Like reference numbers refer to like or similar parts. FIG. 8 illustrates a different structure for the floating separators 220 provided within the diamond-shaped opening 212 of the central diamond-shaped region 102. In this implementation, rather than provide a single floating separator 220 structure within each opening 212 (as shown in FIG. 5), a plurality of floating separators 230 are providing within each opening 212. FIG. 8 illustrates a tiled arrangement for the plurality of floating separators 230. It will be understood, however, that this arrangement is merely exemplary of one way to arrange the plurality of floating separators 230 within each opening 212. Furthermore, the use of diamond-shaped tiles for the plurality of floating separators 230 is exemplary only, it being understood that other tile shapes, for example, round, triangular, hexagonal, rectangular, and the like, could instead be chosen.

FIG. 8 further illustrates a different structure for the floating separators 120. In this implementation, rather than provide floating separators 120 in the form of linear segments (as shown in FIG. 4A), the regions 112 between projecting fingers 106 are filled with a plurality of floating separators 240. FIG. 8 illustrates a tiled arrangement for the plurality of floating separators 240. It will be understood, however, that this arrangement is merely exemplary of one way to arrange the plurality of floating separators 240 within the regions 112. Furthermore, the use of diamond-shaped tiles for the plurality of floating separators 240 is exemplary only, it being understood that other tile shapes, for example, round, triangular, hexagonal, rectangular, and the like, could instead be chosen.

The floating separators 230 and 240 are conductive segments which are not electrically connected to each other or to any other structure of the sensor. In a preferred single layer ITO implementation, the floating separators 230 and 240 are formed by the same single patterned ITO layer used for the diamond-shaped ring 210 (of the central diamond-shaped region 102), the plurality of projecting fingers 106, the connecting member 108, and the structures 200 of the column sensors (including projecting fingers 114).

The structures described herein provide a number of advantages in comparison to the prior art structures of FIGS. 1 and 2.

The reduction in the Xsense diamond area reduces the noise captured from the LCD below the capacitive touchscreen panel.

The finger projections increase the perimeter of interaction between the Xsense and Yforce. The mutual capacitance is now focused in the Xsense fingers projecting into the Yforce structure. This improves the sensitivity of the touch panel by increasing the mutual coupling resulting in improved sensitivity in spite of reduced Xsense area.

The operating linearity profile for the sensor is improved as the coupling is more uniform moving across channels.

The floating separator aids in increasing the fringing fields which in turn increases the sensitivity of the capacitive touchscreen panel.

The structure in its preferred implementation uses only one layer of ITO for both the X and Y sensors, therefore providing a reduced thickness of the sensor and accordingly a reduced thickness of an LCD stack up including the sensor.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A capacitive sensing structure, comprising:
   a plurality of first electrically conductive sensor structures electrically coupled to each other in a first direction;
   a plurality of second electrically conductive sensor structures electrically coupled to each other in a second direction;
   wherein each of the first electrically conductive sensor structures comprises:
      a central diamond-shaped region having a peripheral edge; and
      a plurality of first finger structures electrically coupled to the central diamond-shaped region, each first finger structure extending away from the peripheral edge terminating at a distal end;
   wherein the central diamond-shaped region has a first bisecting dimension parallel to the first direction and a second bisecting dimension parallel to the second direction;
   wherein each of the plurality of first finger structures extend away from the peripheral edge perpendicularly to the first direction and parallel to the second direction.

2. The structure of claim 1, wherein said second bisecting dimension is smaller than the first bisecting dimension.

3. The structure of claim 2, wherein a ratio of the second bisecting dimension to the first bisecting dimension is in the range of 1:3 to 3:4.

4. The structure of claim 3, wherein the ratio is approximately 1:2.

5. The structure of claim 1, wherein the central diamond-shaped region includes a central diamond shaped opening.

6. The structure of claim 5, further including a single electrically conductive structure located within the central diamond shaped opening, said electrically conductive structure being electrically floating with respect to the plurality of first electrically conductive sensor structures and plurality of second electrically conductive sensor structures.

7. The structure of claim 5, further including a plurality of electrically conductive structures located within the central diamond shaped opening, said electrically conductive structures being electrically floating with respect to each other and the plurality of first electrically conductive sensor structures and plurality of second electrically conductive sensor structures.

8. The structure of claim 7, wherein the plurality of electrically conductive structures are arranged in a tiled manner.

9. The structure of claim 1, wherein the first and second directions are orthogonal.

10. The structure of claim 1, further including at least one electrically conductive structure located between adjacent ones of the plurality of first finger structures, said at least one electrically conductive structure being electrically floating with respect to the plurality of first electrically conductive sensor structures and plurality of second electrically conductive sensor structures.

11. The structure of claim 1, further including a plurality of electrically conductive structures located between adjacent ones of the plurality of first finger structures, said plurality of electrically conductive structures being electrically floating with respect to each other and the plurality of first electrically conductive sensor structures and plurality of second electrically conductive sensor structures.

12. The structure of claim 11, wherein the plurality of electrically conductive structures are arranged in a tiled manner.

13. The structure of claim 1, wherein each of the second electrically conductive sensor structures comprises: a plurality of second finger structures, each second finger structure extending between adjacent ones of the plurality of first finger structures and terminating at a second distal end adjacent the peripheral edge.

14. The structure of claim 13, further including at least one electrically conductive structure located between one of the plurality of first finger structures and one of the plurality of second finger structures, said at least one electrically conductive structure being electrically floating with respect to the plurality of first electrically conductive sensor structures and plurality of second electrically conductive sensor structures.

15. The structure of claim 13, further including a plurality of electrically conductive structures located between one of the plurality of first finger structures and one of the plurality of second finger structures, said plurality of electrically conductive structures being electrically floating with respect to each other and the plurality of first electrically conductive sensor structures and plurality of second electrically conductive sensor structures.

16. The structure of claim 15, wherein the plurality of electrically conductive structures are arranged in a tiled manner.

17. The structure of claim 15, wherein the plurality of electrically conductive structures include a linear segment structure positioned between one of the plurality of first finger structures and one of the plurality of second finger structures.

18. The structure of claim 15, wherein the plurality of electrically conductive structures include a linear segment structure positioned between the second distal end of one of the plurality of second finger structures and the peripheral edge of the central diamond-shaped region.

19. The structure of claim 15, wherein the plurality of electrically conductive structures include a curved segment structure wrapping around the first distal end of one of the plurality of first finger structures.

20. A capacitive sensing structure, comprising:
a plurality of first electrically conductive sensor structures electrically coupled to each other in a first direction, each of the first electrically conductive sensor structures comprising:
a first central region; and
a plurality of first finger structures electrically coupled to the first central region, each first finger extending away from the first central region and terminating at a first distal end;
wherein the first central region has a first bisecting dimension parallel to the first direction and a second bisecting dimension parallel to the second direction;
wherein each of the plurality of first finger structures extends perpendicularly to the first direction and parallel to the second direction; and
a plurality of second electrically conductive sensor structures electrically coupled to each other in a second direction, each of the second electrically conductive sensor structures comprising:
a second central region; and
a plurality of second finger structures electrically coupled to the second central region, each second finger structure extending away from the second central region and terminating at a second distal end;
wherein the second central region has a first bisecting dimension parallel to the first direction and a second bisecting dimension parallel to the second direction;
wherein each of the plurality of second finger structures extends away from the peripheral edge perpendicularly to the first direction and parallel to the second direction;
wherein each second finger structure extends between adjacent first finger structures.

21. The structure of claim 20, wherein the first and second finger structures are oriented to extend parallel to each other.

22. The structure of claim 20, wherein the first central region is diamond-shaped.

23. The structure of claim 22, wherein the diamond-shaped first central region has a first bisecting dimension parallel to the first direction and a second bisecting dimension parallel to the second direction, said second bisecting dimension being smaller than the first bisecting dimension.

24. The structure of claim 20, wherein the first central region includes a central opening.

25. The structure of claim 24, further including at least one electrically conductive structure located within the central opening, said at least one electrically conductive structure being electrically floating with respect to the plurality of first electrically conductive sensor structures and plurality of second electrically conductive sensor structures.

26. The structure of claim 20, further including at least one electrically conductive structure located between one first finger structure and one second finger structure adjacent to the one first finger structure, said at least one electrically conductive structure being electrically floating with respect to the plurality of first electrically conductive sensor structures and plurality of second electrically conductive sensor structures.

27. A capacitive sensing structure, comprising:
a plurality of electrically conductive sensor structures electrically coupled to each other in a first direction, each electrically conductive sensor structure comprising:
a diamond-shaped central region; and
a plurality of finger structures electrically coupled to the diamond-shaped central region, each finger structure extending away from the diamond-shaped central region towards a second direction and terminating at a distal end;
wherein the central diamond-shaped region has a first bisecting dimension parallel to the first direction and a second bisecting dimension parallel to the second direction;
wherein each of the plurality of first finger structures extend perpendicularly to the first direction and parallel to the second direction.

28. The structure of claim 27, wherein the diamond-shaped central region includes a diamond shaped central opening.

29. The structure of claim 28, further including at least one electrically conductive structure located within the diamond shaped central opening, said at least one electrically conductive structure being electrically floating with respect to the diamond-shaped central region and plurality of finger structures.

30. The structure of claim 27, further including at least one electrically conductive structure located between adjacent ones of the plurality of finger structures, said at least one electrically conductive structure being electrically floating with respect to the diamond-shaped central region and plurality of finger structures.

\* \* \* \* \*